United States Patent
Quesada

(10) Patent No.: US 6,499,744 B1
(45) Date of Patent: Dec. 31, 2002

(54) PIPE GASKET WITH DUAL PURPOSE TAIL

(75) Inventor: Guido Quesada, Sabanilla Montes de Oca (CR)

(73) Assignee: S&B Technical Products, Inc., Fort Worth, TX (US)

( * ) Notice: Subject to any disclaimer, the term of this patent is extended or adjusted under 35 U.S.C. 154(b) by 3 days.

(21) Appl. No.: 09/587,649

(22) Filed: Jun. 5, 2000

(51) Int. Cl.[7] .................................................. F16J 15/10
(52) U.S. Cl. ........................ 277/609; 277/611; 277/626
(58) Field of Search .............................. 277/608, 609, 277/611, 612, 626

(56) References Cited

U.S. PATENT DOCUMENTS

| | | | |
|---|---|---|---|
| 2,245,153 A | * | 6/1941 | McWane |
| 3,135,520 A | | 6/1964 | Borah .......................... 277/235 |
| 3,377,659 A | | 4/1968 | Hucks, Jr. ....................... 18/19 |
| 3,843,302 A | | 10/1974 | Petzetakis ................... 425/388 |
| 3,907,481 A | | 9/1975 | Heisler ....................... 425/393 |
| 4,030,872 A | | 6/1977 | Parmann ..................... 425/393 |
| 4,602,793 A | * | 7/1986 | Andrick |
| 4,818,209 A | * | 4/1989 | Petersson et al. |
| 5,067,751 A | * | 11/1991 | Walworth et al. |
| 5,213,339 A | * | 5/1993 | Walworth |
| 5,360,218 A | * | 11/1994 | Percebois et al. |
| 6,105,972 A | * | 8/2000 | Guzowski |
| 6,299,176 B1 | * | 10/2001 | Guzowski et al. |

* cited by examiner

Primary Examiner—Anthony Knight
Assistant Examiner—John L. Beres
(74) Attorney, Agent, or Firm—Bracewell & Patterson, LLP

(57) ABSTRACT

The present invention is a pipe sealing gasket designed for receipt within a bell pipe groove, the bell pipe also having an inside surface. The gasket fitted within the groove allows a spigot pipe having an outside surface to be inserted therein to form a continuous pipe joint. The gasket can be best described with reference to a horizontal axis drawn parallel to the central axis of the bell pipe, the gasket comprising a ring shaped elastomeric body which, when viewed in cross section, includes a leading nose region joined to a lower compression region by a spigot ramp. The gasket also has a socket bulb region joined to the leading nose region by a concave section and a tail portion. The tail portion or the gasket is joined to the lower compression region by a spigot face seal and joined to the socket bulb region by a belling face seal in continuity with a belling ramp. The spigot face seal and lower compression region define an angle $\alpha$ with respect to the horizontal axis prior to insertion of the spigot pipe. The angle $\alpha$ approaches 180° as the spigot pipe is inserted into the socket end of the bell pipe having the sealing gasket therein.

28 Claims, 3 Drawing Sheets

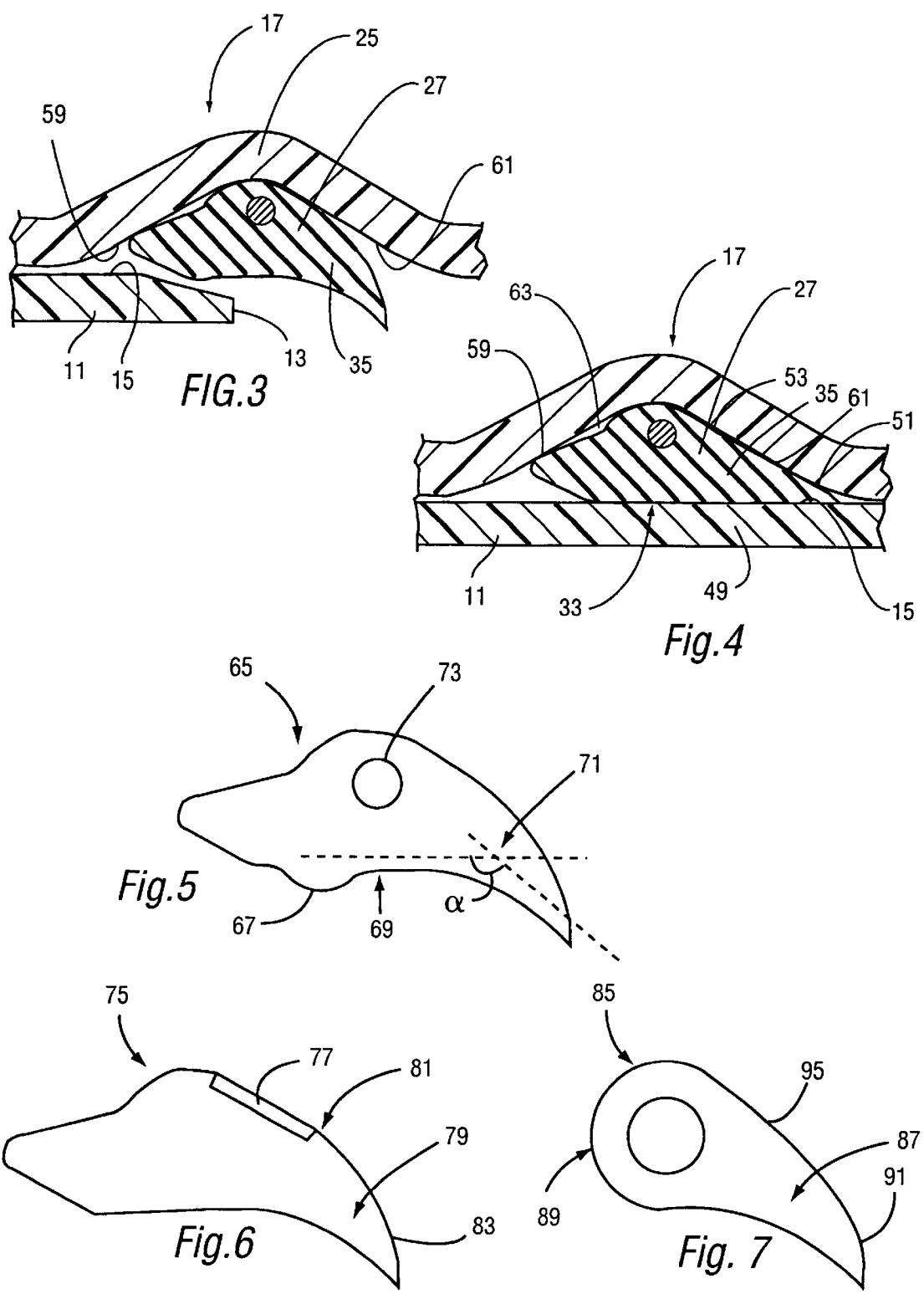

PIPE GASKET WITH DUAL PURPOSE TAIL

BACKGROUND OF THE INVENTION

1. Field of the Invention

The present invention relates in general to elastomeric gaskets for thermoplastic pipe joints. More particularly, the present invention is an improved pipe gasket having a dual-purpose tail portion that forms a belling ramp and a compression seal/spigot guide.

2. Description of the Prior Art

Pipes formed from thermoplastic materials including polyethylene and PVC are used in a variety of industries. In forming a joint between sections of pipe, the spigot or male pipe end is inserted within the female or socket pipe end. An annular, elastomeric ring or gasket is typically seated within a groove formed in the socket end of the thermoplastic pipe. As the spigot is inserted within the socket, the gasket provides the major seal capacity for the joint. It is critical, during the installation process, that the gasket not be able to twist or flip since a displaced or dislocated gasket will adversely affect the ultimate sealing capacity of the joint.

Certain of the prior art techniques have involved the use of gaskets which formed "lip" seals, those seals having a lip portion which was deformed by folding back as the male pipe section was inserted within the female pipe section. Lip seals generally rely upon the internal pipe pressure to provide a sealing effect. In some conditions, these type joints are less than desirable since the lip seal can peel away, allowing leakage through the joint. Particularly, under pulsating pressure conditions, lip seals can provide less than satisfactory results. A sudden decrease in internal pipe pressure can result in contamination of the sealing area and of the pipe interior.

One early attempt to ensure the integrity of pipe joints used under demanding conditions was to provide local reinforcement of the groove portion of the female socket end by means of a heavier wall thickness in this region of the pipe. In some cases, reinforcing sleeves were also utilized. Each of these solutions was less than ideal, in some cases failing to provide the needed joint integrity and often contributing to the complexity and expense of the manufacturing operation.

In the early 1970's, a new technology was developed by Rieber & Son of Bergen, Norway, referred to in the industry as the "Rieber Joint." The Rieber system employed a combined mold element and sealing ring for sealing a joint between the socket end and spigot end of two cooperating pipes formed from thermoplastic materials. In the Rieber process, the elastomeric gasket was inserted within an internal groove in the socket end of the female pipe as the female or belling end was simultaneously being formed. The provision of a prestressed and anchored elastomeric gasket during the belling process at the pipe factory provided an improved socket end for a pipe joint with a sealing gasket which would not twist or flip or otherwise allow impurities to enter the sealing zones of the joint, thus increasing the reliability of the joint and decreasing the risk of leaks or possible failure due to abrasion. The Rieber process is described in the following issued United States patents, among others: U.S. Pat. Nos. 4,120,521; 4,061,459; 4,030,872; 3,965,715; 3,929,958; 3,887,992; 3,884,612; and 3,776,682.

The Rieber system, with its integrally installed gasket provided a compression seal geometry, rather than relying upon the lip seal systems of the prior art. As the female socket end of the pipe cooled around the previously installed gasket, the elastomeric body of the gasket was compressed between a steel reinforcing ring and the groove formed in the socket end of the pipe. When the mating spigot was installed to make up a pipe joint, further compression of the gasket occurred in a radial direction along an internal compression region of the gasket.

Despite the advances offered by the Rieber process, the compression seal geometry presented problems in certain field applications. In some applications, particularly involving larger diameter pipe, the insertion force needed to install the male spigot end within the mating socket end required a high insertion force which could, on some occasions, cause the gasket to be distorted or displaced.

Another problem with the prior art gaskets is that the geometry of the gasket is such that the metal reinforcing ring used to stabilize the gasket must be small in order to accommodate the complex and often narrow profile of prior art gaskets. Current Rieber seal designs are relatively complicated, especially if they feature lips or slender bulbs for high interference with the spigot (thus high compression seal) and low insertion force. The tail in most prior art gaskets is used only for the belling process, therefor additional material is required to build the other parts of the gasket. Further, in order to provide room for the lip or bulb to flow during assembly, the profile must be relatively high and the size of the reinforcing ring thus restricted by the surrounding parts of the gasket. What is needed is an improved gasket that allows for simpler demolding and less material input, while also allowing for a larger reinforcing ring to be used.

SUMMARY OF THE INVENTION

Therefore, it is one object of the present invention to provide an improved gasket for use in bell-ended thermoplastic pipes.

It is another object of the present invention to provide a gasket having a simplified profile for easier demolding.

It is yet another object of the present invention to provide a gasket that provides a large interference with the inserted spigot pipe to thus effectuate a tight seal.

It is yet another object of the present invention to provide a gasket with a low insertion force necessary to insert the spigot pipe.

It is yet another object of the present invention to provide a gasket having space for a large metal reinforcing ring that is between about 40% and 60% the thickness of the gasket.

These and other objects are achieved by providing a pipe sealing gasket designed for receipt within a bell pipe groove, the bell pipe also having an inside surface. The gasket fitted within the groove allows a spigot pipe having an outside surface to be inserted therein to form a continuous pipe joint. The gasket can be best described with reference to a horizontal axis drawn parallel to the central axis of the bell pipe, the gasket comprising a ring shaped elastomeric body which, when viewed in cross section, includes a leading nose region joined to a lower compression region by a spigot ramp. The gasket also has a socket bulb region joined to the leading nose region by a concave section and a tail portion.

The tail portion or the gasket is joined to the lower compression region by a spigot face seal and joined to the socket bulb region by a belling face seal in continuity with a belling ramp. The spigot face seal and lower compression region define an angle α with respect to the horizontal axis prior to insertion of the spigot pipe. The angle α approaches 180° as the spigot pipe is inserted into the socket end of the bell pipe having the sealing gasket therein. Further, the belling face seal is in continuity with the belting ramp, thus creating a continuous ramp-surface for belling when the gasket is in its belling state on a belling mandrel.

The gasket also has an engaged position that creates a seal between the spigot and bell pipes. In the engaged position, the belling face seal is sealingly engaged with the inside surface of the bell pipe when the spigot pipe is inserted into the socket end of the bell pipe. Further, the spigot face seal is sealingly engaged with the outside surface of the spigot pipe when the spigot pipe is inserted into the socket end of the bell pipe, thus forcing the gasket into its engaged state.

The gasket further includes a metal reinforcing element which runs about the diameter thereof. Also, the concave section of the gasket forms a cavity between the inside surface of the bell pipe groove and the gasket when in the engaged position. Further, the lower compression region can also include at least one annular protuberance for sealingly engaging the outside surface of the spigot pipe. Finally, the gasket has a thickness, and wherein the diameter of the reinforcing element is between about 40% and 60% the total thickness of the gasket.

Additional objects, features and advantages will be apparent in the written description which follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 3 is a cross-sectional view of the gasket of the invention in its insertion state within a groove of a bell pipe;

FIG. 4 is a cross-sectional view of the gasket of the invention in its engaged state within the groove of a bell pipe and fully engaged with a spigot pipe outside surface;

FIG. 5 is a cross-sectional view of another embodiment of the gasket of the invention;

FIG. 6 is a cross-sectional view of another embodiment of the gasket of the invention; and FIG. 7 is a cross-sectional view of another embodiment of the gasket of the invention.

DETAILED DESCRIPTION OF THE INVENTION

The present invention is a pipe sealing gasket designed for receipt within a bell pipe groove provided within a socket end of a bell pipe having an inside surface. The gasket is fitted within the groove, thus allowing a spigot pipe having a substantially uniform outside surface to be inserted therein to form a continuous pipe joint. Further, the bell pipe can be described as having a horizontal axis drawn parallel to the central axis of the bell pipe, the gasket placed within the groove that is also concentric with the axis. The gasket includes a tail portion joined to a lower compression region and terminating in a sharp angular tail which initially protrudes radially inward in the direction of the central axis of the pipe. This protrusion makes sealing contact with a spigot pipe once inserted into the bell pipe having the gasket.

Specifically, the gasket is a ring shaped elastomeric body which, when viewed in cross section, includes a leading nose region joined to a lower compression region by a spigot ramp. A dual-purpose tail portion is joined to the lower compression region, the tail having a belling state and a insertion state. The tail portion forms a belling ramp in its belling state and provides a sealing means between the inside surface of the bell pipe and the outside surface of the spigot pipe in its insertion state. The sealing means is a compression seal that is formed between the outside surface of the spigot pipe and the gasket, and the inside surface of the bell pipe groove and the gasket. The sealing means is actuated in the engaged state of the gasket. Specifically, in the engaged state of the gasket, the belling face seal is sealingly engaged with the inside surface of the bell pipe when the spigot pipe is inserted into the socket end of the bell pipe. Further effectuating the engaged state is a spigot face seal located on the tail portion, the spigot face seal being sealingly engaged with the outside surface of the spigot pipe when inserted into the socket end of the bell pipe.

Figure 1A:
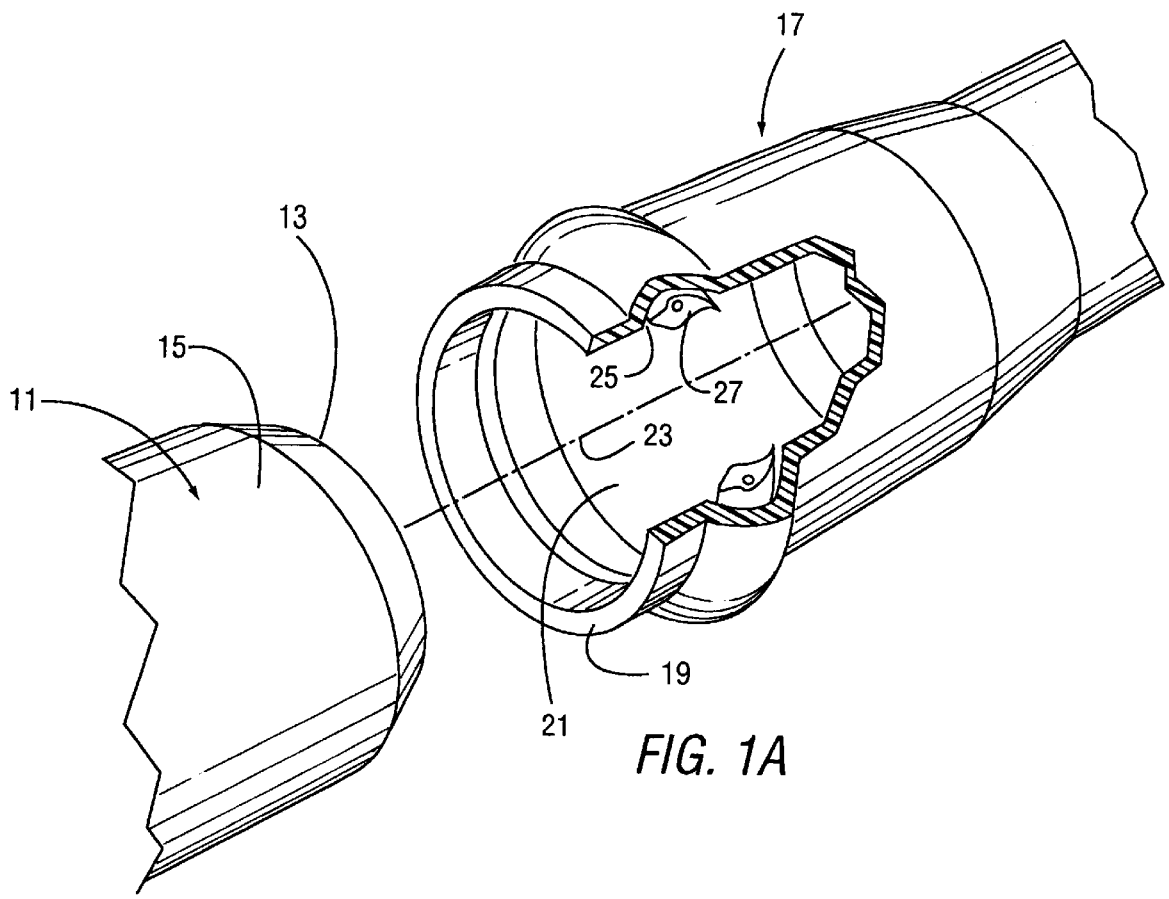
FIG. 1A is a perspective view of a spigot pipe end and a bell pipe end having a gasket of the invention therein.

The pipe sealing gasket of the present invention is further described with reference to the figures, and in particular, with reference first to FIG. 1A and FIG. 1B. The gasket is used to create a string of pipes, wherein a spigot pipe 11 and bell pipe 17 are joined together, the gasket effectuating a seal between the two, thus forming a joint. Typically, the spigot pipe 11 (or male pipe) has a spigot pipe end 13 and outside surface 15. The bell pipe 17 (or female pipe) has a bell pipe socket end 19 and an inside surface 21. Furthermore, bell pipe 17 also has a groove 25, wherein gasket 27 resides. Groove 25 is an annular protrusion around the circumference of the bell pipe 17, having a central axis which is defined by horizontal axis 23. Horizontal axis 23 typically runs through the center of bell pipe 17 and defines the central axis of the inside surface 21 as well as the central axis of the groove 25. Certain portions of the gasket are described with reference to horizontal axis 23.

The gasket 27 residing in groove 25 helps to effectuate a water-tight seal between spigot pipe 11 and bell pipe 17. This is accomplished by creating a tight seal between the outside surface 15 of spigot pipe 11, which is inserted into the bell pipe end 19, and the inside surface 21 of the bell pipe. The gasket and bell pipe assembly shown in FIG. 1A is formed by a belling process, wherein a gasket is first placed on a cylindrical mandrel (also shown as the "belling state" of the gasket in FIG. 2), followed by forcing a softened thermal plastic material over and around the gasket and allowing the plastic to harden, thus forming a pipe with a groove and gasket therein. This method of belling a pipe and gasket, typically called the Rieber process or generally a belling process, is common in the art.

Figure 1B:
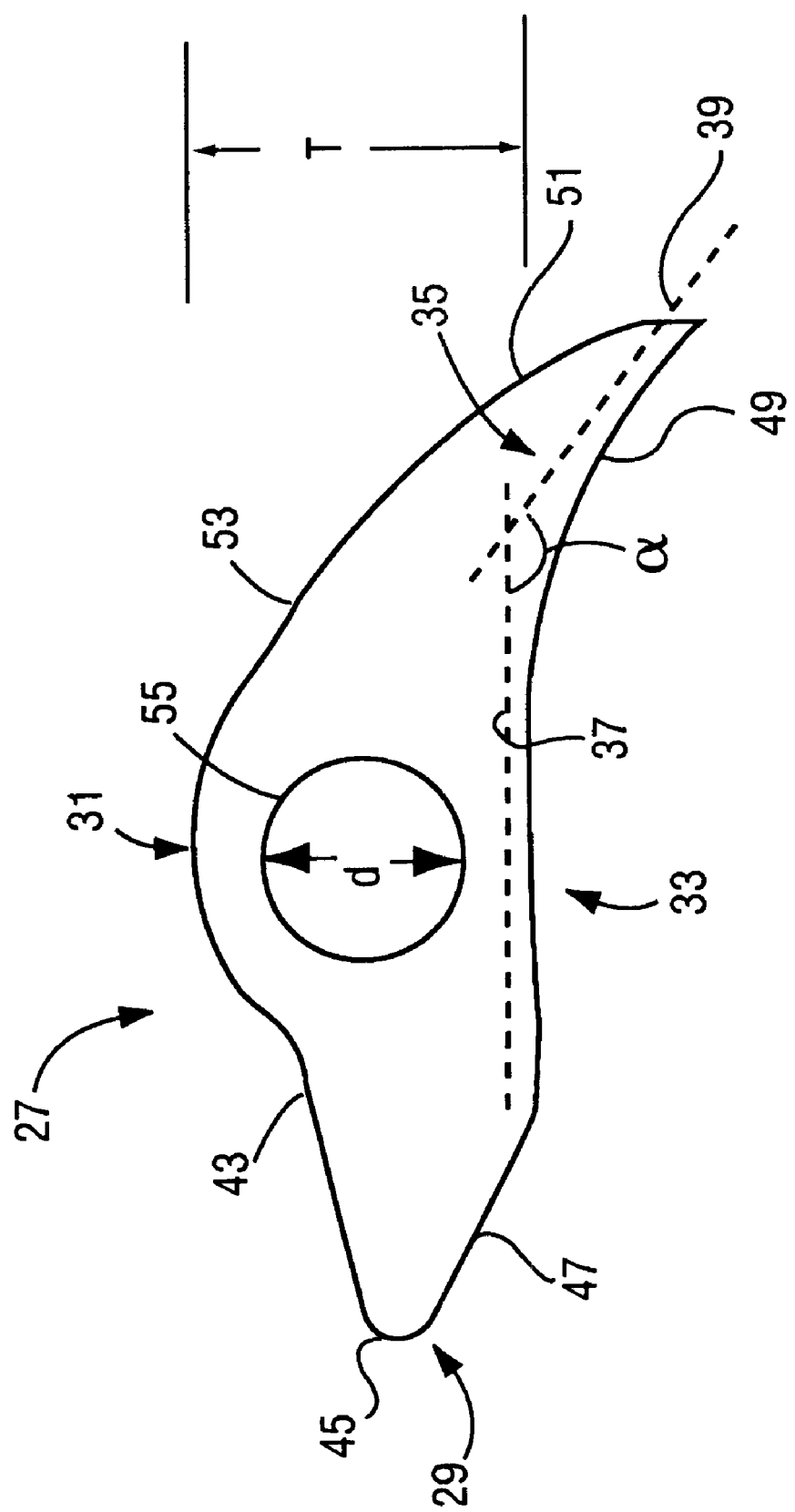
FIG. 1B is a cross-sectional view of one embodiment of the gasket of the invention.

Gasket 27 is described in greater detail in FIG. 1B, wherein one embodiment of gasket 27 is shown. There are many embodiments of the gasket of the present invention, and FIG. 1B is representative of only one embodiment and not meant to be limiting of the invention. The gasket 27 can be best described with reference to a cross-section, and further with reference to a compression region axis 37 which is parallel to the horizontal axis 23 of the bell pipe. The gasket 27 comprises four primary regions: the leading nose region 29, the socket bulb region 31, the lower compression region 33, and the tail portion 35. The leading nose region 29 is joined to the lower compression region 33 by the spigot ramp 47, the spigot 47 creating a sloped surface to allow the spigot end 13 to be inserted into the bell pipe 17. Also, the leading nose region is joined to the socket bulb region by the concave section 43. The socket bulb region is typically in firm contact with the inside wall of groove 25.

Gasket 27 has a tail portion 35 which serves the dual function of a belling ramp and a compression seal for the spigot pipe once inserted. The tail portion 35 has a spigot face seal 49 which is coupled to and continuous with the lower compression region 33. Further, the tail portion 35 also has a belling face seal 51 which is coupled to and continuous with the belling ramp 53. The tail portion 35 generally resides within an axis 39, axis 37 and axis 39 forming an angle α.

With continued reference to FIG. 1B, gasket 27 is also defined by having a thickness T, T being the distance between the socket bulb region 31 and the lower compression region 33. Further, the gasket 27 is also characterized by having a metal reinforcing element 55 running there through. The metal reinforcing element 55 has a diameter d, wherein d varies between about 40%–60% of T. The geometry of the gasket 27 of the present invention allows for a relatively large diameter metal reinforcing element 55, relative to the thickness T of the gasket.

Figure 2:
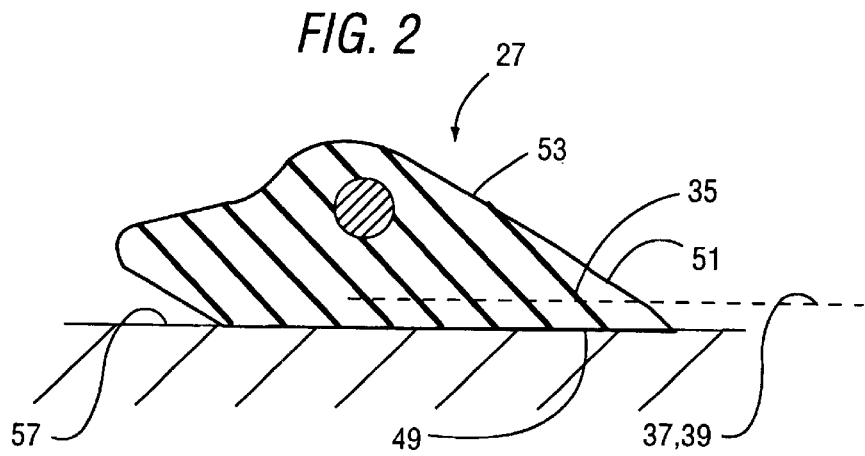
FIG. 2 is a cross-sectional view of the gasket of the invention in its belling state, mounted on a belling mandrel.

The dual function of the tail portion 35 is best described with reference to FIGS. 2–4, wherein the various states of the gasket are described. The belling state of the gasket 27 is described with reference to FIG. 2, wherein the gasket 27 is placed over a mandrel having an outside surface 57. The spigot face seal 49 of the gasket makes contact with the mandrel surface 57, and axis 37 and 39 are coincident as the tail portion 35 is forced upwards and coplanar with the compression region axis 37. This action of the tail region 35 creates a belling ramp, the belling ramp comprising the belling face seal 51 in continuity with the belling ramp 53. The belling ramp 53 and belling face seal 51 create a ramp for the soft thermal plastic pipe material to flow over the gasket on the mandrel during the belling process, thus forming a groove for the gasket to reside therein once the thermoplastic pipe material hardens.

The insertion state of gasket 27 is shown with reference to FIG. 3. After belling, the gasket 27 resides in groove 25 having a forward slope 59 and a rearward slope 61. The tail portion in the insertion state creates the angle α with respect to the compression region axis 37. This serves the purpose of guiding the spigot end 13 of spigot pipe 11 into the bell pipe 17, while also effectuating a compression seal between the spigot face seal, in continuity with the lower compression region 33, and the outside surface 15 of the spigot pipe.

The engaged state of the gasket of the present invention is shown with reference to FIG. 4. In the engaged state, the spigot pipe 11 is fully inserted into the bell pipe 17. The outside surface 15 thus engages the gasket and forces the tail portion 35 upwards into groove 25 and against the rearward slope 61, thus creating a seal between the surface 61 and the belling face seal 51. The spigot face seal 49 of the gasket makes sealingly engages the outside surface 15, and axis 37 and 39 are coincident—the angle α is about 180°—as the tail portion 35 is forced upwards and coplanar with the compression region axis 37. Also in the engaged state, belling face seal 51 in continuity with the belling ramp 53 create a compression seal against the inside surface of the bell pipe 17. Further, the upward compression against the tail portion 35 forces the socket bulb region 31 and the leading nose region 29 firmly against the inside surface of the groove, and in particular, against the forward slope 59. The concave section 43 creates a cavity 63 between the inside surface of the groove 25 and the gasket 27. The cavity allows room to displace material when the spigot pipe is inserted, and also helps to define the shape of the socket bulb region 31.

Various other possible embodiments of the gasket of the present invention are exemplified in FIGS. 5–7. These embodiments are by no means meant to be limiting of the configuration of the gasket of the present invention. Each embodiment incorporates a tail portion forming a angle α with respect to a compression region axis 37. This gives the tail portion its dual purpose as a belling ramp and a compression seal for the spigot pipe. The embodiment in FIG. 5 shows gasket 65 having an annular protuberance 67 residing on lower compression region 69. The tail portion 71 of gasket 65 creates an angle α when gasket 65 is in its insertion state as shown in FIG. 5. Gasket 65 is also shown having a metal reinforcing element 73 with a smaller diameter relative to the embodiment shown in gasket 27.

Another embodiment of the gasket of the present invention is shown with reference to FIG. 6, wherein gasket 75 has a external metal reinforcing element 77 running across the portion of the gasket forming belling ramp 81. Belling ramp 81 is continuous with the belling face seal 83, both of which reside on tail portion 79. The configuration of the tail portion 79, as in the embodiment of gasket 27, serves the dual purpose of forming a belling ramp in the belling state, and a compression seal in the engaged state while guiding the spigot pipe into the bell pipe in the insertion state (shown in FIG. 6).

Yet another embodiment of the gasket of the present invention is shown with reference to FIG. 7, wherein gasket 85 having tail portion 87 also has a simplified leading nose region 89, the gasket 85 being in the insertion state. Gasket 85 is ideal for forming low pressure pipe joints, wherein the tail portion 87 having belling face 91 and belling ramp 95 in continuity with another would form a seal against the groove of a belling pipe and also serve as a belling ramp for the belling process.

In each embodiment of the gasket of the present invention, the tail portion which defines a tail portion axis, forms an angle α with respect to a compression region axis, the compression region axis being parallel to the horizontal axis 23 of the belling pipe. The angle α can be most any angle between about 90°–180°. Preferably, the angle α is between about 100°–130° in the insertion state.

The gasket of the present invention offers several advantages over the prior art. The dual-purpose tail serves both as a belling ramp for molding the groove in the belling pipe, and a lip for self-energizing sealing against the spigot. This affords a great economy of material.

Another advantage to the gasket is that the seal profile (T) can be lowered significantly without affecting the tail size or interference. The socket bulb region provides concentrated contact pressure for sealing against the groove in the bell pipe. This allows the use of a large reinforcing ring if so desired, such that the diameter d of the ring can be from 40% to 60% the thickness T of the gasket.

Another advantage to the present gasket is that the simplified profile is much easier to demold than existing Rieber designs, especially those having complicated features such as a lip or slender bulb.

Another advantage to the present gasket is that the dual-purpose tail allows for a very simple design for low pressure uses, thus reducing costs and simplifying the demolding process after belling.

While the invention has been shown in only one of its forms, it is not thus limited but is susceptible to various changes and modifications without departing from the spirit thereof.

What is claimed is:

1. A pipe sealing gasket designed for receipt within a bell pipe groove provided within a socket end of a bell pipe having an inside surface, wherein the gasket fitted within the groove allows a spigot pipe having an outside surface to be inserted therein to form a continuous pipejoint, the bell pipe having a horizontal axis drawn parallel to the central axis of the bell pipe, the gasket comprising:

a ring shaped elastomeric body which, when viewed in cross section, includes a leading nose region joined to a lower compression region by a spigot ramp;

a tail portion extending from a trailing portion of the body and joined by a smooth, continuous transition to the lower compression region, the tail portion having a belling state and an insertion state, the tail portion extending rearward in the insertion and belling states and inward in the insertion state; and wherein the tail portion forms a belling ramp in its belling state and provides a sealing means between the inside surface of the bell pipe and the outside surface of the spigot pipe in its insertion state.

2. The pipe sealing gasket of claim 1, wherein the tail portion also has a belling face seal, the belling face seal being in continuity with the belling ramp to create a continuous ramp-surface for belling.

3. The pipe sealing gasket of claim 2, wherein the belling face seal is sealingly engaged with the inside surface of the bell pipe when the spigot pipe is inserted into the socket end of the bell pipe.

4. The pipe sealing gasket of claim 1, wherein the tail portion further includes a spigot face seal, the spigot face seal being sealingly engaged with the outside surface of the spigot pipe when inserted into the socket end of the bell pipe.

5. The pipe sealing gasket of claim 1, wherein the gasket further includes a metal reinforcing element which runs about the diameter thereof.

6. The pipe sealing gasket of claim 1, wherein a concave section forms a cavity between the inside surface of the bell pipe groove and the gasket.

7. The pipe sealing gasket of claim 1, wherein the lower compression region also includes at least one annular protuberance for sealingly engaging the outside surface of the spigot pipe.

8. The pipe sealing gasket of claim 5, wherein the gasket has a thickness, and wherein the diameter of the reinforcing element is between about 40% and 60% the total thickness of the gasket.

9. The pipe sealing gasket of claim 1, wherein the bell pipe groove has a forward slope and a rearward slope, the gasket further including a protuberance in the leading nose region for sealingly engaging the forward slope of the groove.

10. A pipe sealing gasket designed for receipt within a bell pipe groove provided within a socket end of a bell pipe having an inside surface, wherein the gasket fitted within the groove allows a spigot pipe having an outside surface to be inserted therein to form a continuous pipe joint, the bell pipe having a horizontal axis drawn parallel to the central axis of the bell pipe, the gasket comprising:

a ring shaped elastomeric body which, when viewed in cross section, includes a leading nose region joined to a lower compression region by a spigot ramp;

a tail portion extending from a trailing portion of the body and joined by a smooth, continuous transition to the lower compression region and terminating in a sharp angular tail which extends rearward and initially protrudes radially inward in the direction of the central axis of the pipe.

11. The pipe sealing gasket of claim 10, the tail portion further including a belling face seal, the belling face seal being in continuity with a belling ramp thus creating a continuous ramp-surface for belling.

12. The pipe sealing gasket of claim 10, wherein the belling face seal is sealingly engaged with the inside surface of the bell pipe when the spigot pipe is inserted into the socket end of the bell pipe.

13. The pipe sealing gasket of claim 10, wherein the tail portion further includes a spigot face seal, the spigot face seal being sealingly engaged with the outside surface of the spigot pipe when the spigot pipe is inserted into the socket end of the bell pipe.

14. The pipe sealing gasket of claim 10, wherein the gasket further includes a metal reinforcing element which runs about the diameter thereof.

15. The pipe sealing gasket of claim 10, wherein a concave section forms a cavity between the inside surface of the bell pipe groove and the gasket.

16. The pipe sealing gasket of claim 10, wherein the lower compression region also includes at least one annular protuberance for sealingly engaging the outside surface of the spigot pipe.

17. The pipe sealing gasket of claim 14, wherein the gasket has a thickness, and wherein the diameter of the reinforcing element is between about 40% and 60% the total thickness of the gasket.

18. The pipe sealing gasket of claim 10, wherein the bell pipe groove has a forward slope and a rearward slope, the gasket further including a protuberance in the leading nose region for sealingly engaging the forward slope of the groove.

19. A pipe sealing gasket designed for receipt within a bell pipe groove provided within a socket end of a bell pipe having an inside surface, wherein the gasket fitted within the groove allows a spigot pipe having an outside surface to be inserted therein to form a continuous pipe joint, the bell pipe having a horizontal axis drawn parallel to the central axis of the bell pipe, the gasket comprising:

a ring shaped elastomeric body which, when viewed in cross section, includes a leading nose region joined to a lower compression region by a spigot ramp;

a socket bulb region joined to the leading nose region by a concave section; and a tail portion, wherein the tail portion extends rearward from a trailing portion of the body and is joined to the lower compression region by a spigot face seal and joined to the socket bulb region by a belling face seal in continuity with a belling ramp, the spigot face seal and lower compression region forming a smooth continuous surface and defining an angle $\alpha$ with respect to the horizontal axis prior to insertion of the spigot pipe.

20. The pipe sealing gasket of claim 19, wherein the angle $\alpha$ approaches 180° as the spigot pipe is inserted into the socket end of the bell pipe having the sealing gasket therein.

21. The pipe sealing gasket of claim 19, wherein the belling face seal is in continuity with the belling ramp thus creating a continuous ramp-surface for belling.

22. The pipe sealing gasket of claim 19, wherein the belling face seal is sealingly engaged with the inside surface of the bell pipe when the spigot pipe is inserted into the socket end of the bell pipe.

23. The pipe sealing gasket of claim 19, wherein the spigot face seal is sealingly engaged with the outside surface of the spigot pipe when the spigot pipe is inserted into the socket end of the bell pipe.

24. The pipe sealing gasket of claim 19, wherein the gasket further includes a metal reinforcing element which runs about the diameter thereof.

25. The pipe sealing gasket of claim 19, wherein the concave section forms a cavity between the inside surface of the bell pipe groove and the gasket.

26. The pipe sealing gasket of claim 19, wherein the lower compression region also includes at least one annular protuberance for sealingly engaging the outside surface of the spigot pipe.

27. The pipe sealing gasket of claim 24, wherein the gasket has a thickness, and wherein the diameter of the reinforcing element is between about 40% and 60% the total thickness of the gasket.

28. The pipe sealing gasket of claim 19, wherein the bell pipe groove has a forward slope and a rearward slope, the gasket further including a protuberance in the leading nose region for sealingly engaging the forward slope of the groove.

* * * * *